US012394261B1

(12) United States Patent
Peduzzi et al.

(10) Patent No.: US 12,394,261 B1
(45) Date of Patent: Aug. 19, 2025

(54) SYSTEMS AND METHODS FOR ESTIMATING DRIVER EFFICIENCY

(71) Applicant: Geotab Inc., Oakville (CA)

(72) Inventors: Stefano Peduzzi, Varzo (IT); Johannes Hoh, Aachen (DE); Giuseppe Fidelibus, London (GB)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/052,824

(22) Filed: Feb. 13, 2025

Related U.S. Application Data

(60) Provisional application No. 63/553,012, filed on Feb. 13, 2024.

(51) Int. Cl.
*G07C 5/08* (2006.01)

(52) U.S. Cl.
CPC ......... *G07C 5/0816* (2013.01); *G07C 5/0808* (2013.01); *G07C 5/085* (2013.01)

(58) Field of Classification Search
None
See application file for complete search history.

(56) References Cited

U.S. PATENT DOCUMENTS 7,443,284 B2 10/2008 Curtis
7,561,054 B2 7/2009 Raz et al.
7,659,810 B2 2/2010 Flick
7,659,811 B2 2/2010 Flick
7,821,381 B2 10/2010 Curtis
7,898,404 B2 3/2011 Flick
8,577,703 B2 11/2013 McClellan et al.
8,731,770 B2 5/2014 Fischer
8,791,806 B2 7/2014 Granruth
9,014,953 B2 * 4/2015 Breed .............. G08G 1/096783
340/995.13
9,117,246 B2 8/2015 Mcclellan
9,129,460 B2 9/2015 McCellan et al.
9,147,335 B2 9/2015 Raghunathan et al.
9,349,228 B2 5/2016 Ochsendorf et al.
9,373,257 B2 * 6/2016 Bonhomme ......... G07C 5/0816
9,477,639 B2 10/2016 Fischer et al.
9,481,373 B2 11/2016 Basir et al.
9,604,648 B2 3/2017 Tamari et al.
(Continued)

FOREIGN PATENT DOCUMENTS

EP 3005313 B1 5/2023
EP 3005314 B1 7/2023

*Primary Examiner* — Muhammad Adnan
(74) *Attorney, Agent, or Firm* — Gabriel F. Rogers

(57) ABSTRACT

Disclosed herein are systems and methods for estimating driver efficiency. For example, one such method may comprise operating at least one processor to: receive telematics data originating from a plurality of telematics devices installed in a plurality of vehicles; identify, using the telematics data, a trip completed by at least one vehicle of the plurality of vehicles; determine an estimated trip difficulty of each trip based on a plurality of trip metrics associated therewith that relate to vehicle fuel consumption; determine, using the telematics data, a plurality of driver behavior metrics for each trip, each driver behavior metric corresponding to an action performable by a driver of the at least one vehicle; and determine, for each trip, a driver efficiency score based at least in part on the estimated trip difficulty and the plurality of driver behavior metrics thereof.

13 Claims, 4 Drawing Sheets

(56) References Cited

U.S. PATENT DOCUMENTS 9,688,283 B2 6/2017 Armitage et al.
9,848,289 B2 12/2017 Fischer et al.
9,862,315 B2 1/2018 Hoye
9,925,987 B1 3/2018 Nguyen
10,083,626 B1 9/2018 Fields et al.
10,231,091 B2 3/2019 Fischer et al.
10,311,750 B1 6/2019 Fields et al.
10,380,905 B2 8/2019 Mohn et al.
10,484,825 B2 11/2019 Fischer et al.
10,521,983 B1 12/2019 Hsu-Hoffman et al.
10,748,446 B1 8/2020 Fields et al.
11,341,786 B1 5/2022 Calmer et al.
11,365,980 B1 6/2022 Akhtar et al.
11,548,390 B1 1/2023 Briggs et al.
11,643,102 B1 5/2023 Calmer et al.
11,688,211 B1 6/2023 Calmer et al.
11,749,117 B1 9/2023 Tsai et al.
11,801,750 B2 10/2023 Goenawan et al.
11,842,577 B1 12/2023 Harrison et al.
2007/0262880 A1 11/2007 Curtis
2013/0261846 A1* 10/2013 Mcquade ................ F02D 41/26 701/1
2013/0261939 A1* 10/2013 Mcquade ................ F02D 41/26 701/110
2014/0136092 A1* 5/2014 Robl ...................... G07C 5/008 701/1
2016/0110066 A1* 4/2016 McCormick ........... G07C 5/008 715/243
2016/0280130 A1* 9/2016 Kia ...................... G07C 5/0816
2017/0061825 A1 3/2017 Payne et al.
2017/0140652 A1 5/2017 Hodges et al.
2017/0206717 A1* 7/2017 Kühnapfel ............. G06Q 40/08
2018/0143639 A1* 5/2018 Singhal ................... G01S 15/02
2018/0300816 A1 10/2018 Perl et al.
2018/0330633 A1* 11/2018 Sweany ............... G09B 19/167
2018/0345983 A1* 12/2018 Lindelöf .............. G07C 5/0841
2019/0389378 A1 12/2019 Adams et al.
2020/0104096 A1* 4/2020 Tokunaga ............... G06F 3/167
2020/0130577 A1 4/2020 Mitra et al.
2020/0134943 A1* 4/2020 Inagaki .................... G07C 5/02
2020/0334762 A1 10/2020 Carver et al.
2022/0041169 A1 2/2022 Krishna et al.
2022/0198497 A1 6/2022 Cote et al.
2023/0219592 A1 7/2023 Calmer et al.
2023/0298410 A1 9/2023 Calmer et al.
2024/0067183 A1* 2/2024 Kuehnle ............. B60W 50/085
2024/0112510 A1* 4/2024 Pinals .................. G07C 5/0808

* cited by examiner

SYSTEMS AND METHODS FOR ESTIMATING DRIVER EFFICIENCY

CROSS-REFERENCE TO RELATED APPLICATIONS

This application claims priority to and the benefit of U.S. Patent Application Ser. No. 63/553,012, filed on Feb. 13, 2024, which is hereby incorporated by reference in its entirety.

TECHNICAL FIELD

The present disclosure generally relates to evaluating driver performance. More specifically, the present disclosure relates to estimating driver efficiency using telematics data.

BACKGROUND

Today, many vehicles rely on computer-based systems (e.g., one or more processors) for their operation. As will be appreciated, such systems manage and/or produce many types of data associated with various aspects of the vehicle during the operation thereof that may generally be referred to as "telematics data". As will be described herein, telematics data may include any information, parameters, attributes, characteristics, and/or features associated with the vehicle and may be obtained therefrom using, for example, a telematics device.

Telematics data may be used for a variety of applications. For example, while telematics data may be used to assess or monitor the various systems of a vehicle (e.g., the operability of a vehicle, the speed of a vehicle, the trips completed by a vehicle, etc.), the telematics data may also be used to infer features of the operational environment of a vehicle. In more detail, using telematics data, vehicle operational environment information such as, but not limited to, the types of zones at which a vehicle stops (e.g., a parking lot vs. a commercial domicile), the vocation of a vehicle (e.g., a delivery vehicle, a rideshare vehicle, a personal vehicle, etc.), infrastructural information (e.g., roadway speed limits, roadway bottlenecks, the location of stop signs, etc.), and driver information (e.g., driver operational habits, driver safety, etc.) may be inferred.

Such vehicle operational environment information may have a number of downstream applications. For example, today, there is an increased incentive for businesses with vehicle fleets (e.g., logistics companies, delivery companies, rental car companies, etc.) to maximize the fuel efficiency of the vehicles of the vehicle fleets. In addition to the inherit environmental benefits, such business may substantially reduce their operational costs. For example, by maximizing fuel efficiency, a business operating a vehicle fleet may at least reduce fuel costs while minimizing driver downtime caused by refueling.

One technique for maximizing fuel efficiency involves estimating driver efficiency—i.e., assessing how efficiently the driver is operating the vehicle. Conventionally, the fuel efficiency of a vehicle operated by a particular driver may be determined and used to estimate the efficiency of that particular driver. However, the conventional techniques may have a number of drawbacks. For example, many of such techniques may be inaccurate due to the use of limited types of telematics data, may be limited to only certain types of vehicles (e.g., specific makes, models, years), etc.

A need therefore exists for improved systems and methods for estimating driver efficiency.

SUMMARY

In one aspect, the present disclosure relates to a system for estimating driver efficiency, the system comprising: at least one data storage operable to store telematics data originating from a plurality of telematics devices installed in a plurality of vehicles; and at least one processor in communication with the at least one data storage, the at least one processor operable to: identify, using the telematics data, a trip completed by at least one vehicle of the plurality of vehicles; determine an estimated trip difficulty of each trip based on a plurality of trip metrics associated therewith that relate to vehicle fuel consumption; determine, using the telematics data, a plurality of driver behavior metrics for each trip, each driver behavior metric corresponding to an action performable by a driver of the at least one vehicle; and determine, for each trip, a driver efficiency score based at least in part on the estimated trip difficulty and the plurality of driver behavior metrics thereof.

According to an embodiment, the at least one processor is operable determine the estimated trip difficulty of each trip by determining, for each trip, a trip difficulty classification by applying to the plurality of trip metrics associated therewith at least one machine learning model trained to classify trips based on the plurality of trip metrics associated therewith.

According to an embodiment, the plurality of trip metrics related to vehicle fuel consumption comprises a weight of a vehicle completing the trip, an altitude change experienced by the vehicle completing the trip, a type of roadway traversed by the vehicle completing the trip, or a combination thereof.

According to an embodiment, the plurality of driver behavior metrics comprise brake pedal metrics, accelerator pedal metrics, engine speed metrics, cruise control metrics, ignition metrics, speed metrics, or a combination thereof.

According to an embodiment, the plurality of driver behavior metrics comprise harsh braking metrics, brake pedal depression metrics, acceleration pedal depression metrics, cruise control distance metrics, coasting distance metrics, engine speed threshold metrics, idling time metrics, excessive speed metrics, or a combination thereof.

According to an embodiment, the at least one processor is operable to determine the driver efficiency score for each trip by: generating a plurality of weighted driver behavior metrics by applying to each of the plurality of driver behavior metrics a weight selected based at least in part on a type of each of the plurality of driver behavior metrics and the estimated trip difficulty for each trip; and aggregating the weighted driver behavior metrics for each trip to thereby determine the driver efficiency score thereof.

According to an embodiment, the at least one processor is further operable to generate an aggregated driver efficiency score by aggregating the driver efficiency score associated with each trip completed by the at least one vehicle within a selected time period.

In another aspect, the present disclosure relates to a method for estimating driver efficiency, the method comprising operating at least one processor to: receive telematics data originating from a plurality of telematics devices installed in a plurality of vehicles; identify, using the telematics data, a trip completed by at least one vehicle of the plurality of vehicles; determine an estimated trip difficulty of each trip based on a plurality of trip metrics associated therewith that relate to vehicle fuel consumption; determine, using the telematics data, a plurality of driver behavior metrics for each trip, each driver behavior metric corresponding to an action performable by a driver of the at least one vehicle; and determine, for each trip, a driver efficiency score based at least in part on the estimated trip difficulty and the plurality of driver behavior metrics thereof.

According to an embodiment, the determining of the estimated trip difficulty of each trip comprises determining, for each trip, a trip difficulty classification by applying to the plurality of trip metrics associated therewith at least one machine learning model trained to classify trips based on the plurality of trip metrics associated therewith.

According to an embodiment, the plurality of trip metrics related to vehicle fuel consumption comprises a weight metric of a vehicle completing the trip, an altitude change experienced by the vehicle completing the trip, a type of roadway traversed by the vehicle completing the trip, or a combination thereof.

According to an embodiment, the plurality of driver behavior metrics comprise brake pedal metrics, accelerator pedal metrics, engine speed metrics, cruise control metrics, ignition metrics, speed metrics, or a combination thereof.

According to an embodiment, the plurality of driver behavior metrics comprise harsh braking metrics, brake pedal depression metrics, acceleration pedal depression metrics, cruise control distance metrics, coasting distance metrics, engine speed threshold metrics, idling time metrics, excessive speed metrics, or a combination thereof.

According to an embodiment, the determining of the driver efficiency score for each trip comprises operating the at least one processor to: generate a plurality of weighted driver behavior metrics by applying to each of the plurality of driver behavior metrics a weight selected based at least in part on a type of each of the plurality of driver behavior metrics and the estimated trip difficulty for each trip; and aggregate the weighted driver behavior metrics for each trip to thereby determine the driver efficiency score thereof.

According to an embodiment, the method further comprises operating the at least one processor to generate an aggregated driver efficiency score by aggregating the driver efficiency score associated with each trip completed by the at least one vehicle.

In another aspect, the present disclosure relates to a non-transitory computer-readable medium having instructions stored thereon executable by at least one processor to implement the methods for estimating driver efficiency described herein.

Other aspects and features of the systems and methods of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Today, there is an increased incentive for business that operate or manage vehicle fleets (e.g., logistics companies, delivery companies, rental car companies, etc.) to maximize the fuel efficiencies of the vehicles of the vehicle fleets. As will be appreciated, by maximizing the fuel efficiency of a vehicle fleet, environmental impacts may be mitigated (e.g., less carbon dioxide produced by the vehicle fleet) and operational costs may be substantially reduced. For example, not only are fuel costs reduced, but driver downtime resulting from fuel refills and related activities is minimized.

One technique for maximizing fuel efficiency involves estimating driver efficiency, or, put differently, assessing how efficiently a driver is operating a vehicle. As described herein, conventional techniques for estimating driver efficiency may have a number of drawbacks such as inaccuracies resulting from limited types of telematics data, being limited to only specific vehicles (e.g., specific makes, models, years), and the like.

It is therefore an object of the present disclosure to provided advantageous systems and methods for estimating driver efficiency.

For example, in some embodiments, the systems and methods of the present disclosure may leverage different types of telematics data to infer trip information (e.g., the difficulty of the trip) and driver operational behaviours (e.g., harsh maneuvers, engagement of cruise control, idling, etc.) for estimating driver efficiency. As described herein, trip information and driver operational behaviours generally relate to the operational environment of a vehicle and, when paired with telematics data that relates to internal operation of the vehicle (e.g., engine data), provide a more fulsome dataset for estimating driver efficiency, as both external and internal factors affecting the fuel efficiency of the vehicle may be considered. Further, as will be described herein, the types of telematics data leveraged to estimate driver efficiency may not be limited to a particular type of vehicle. That is, the systems and methods of the present disclosure may be applicable to vehicles of different makes, models, years, etc.

Additional advantages will be discussed below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments, without limitation.

Figure 1:
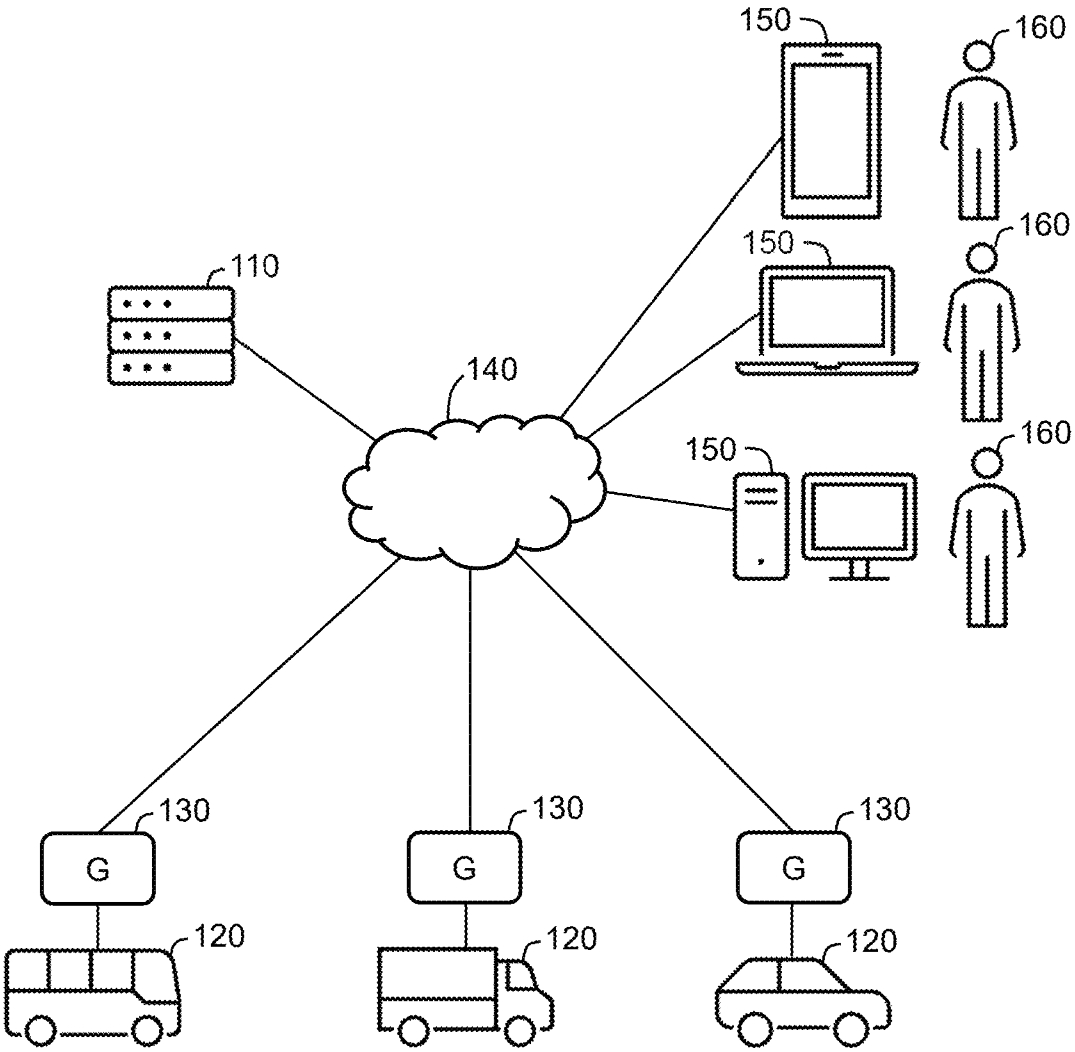
FIG. 1 is a block diagram of various components interacting with an example fleet management system according to an embodiment of the present disclosure.

Referring now to FIG. 1, there is shown an example of a fleet management system 110 for managing a plurality of assets equipped with a plurality of telematics devices 130. Each of the telematics devices 130 is capable of collecting various data from the vehicles 120 (i.e., telematics data) and sharing the telematics data with the fleet management system 110. The fleet management system 110 may be remotely located from the telematics devices 130 and the vehicles 120.

The vehicles 120 may include any type of vehicle. For example, the vehicles 120 may include motor vehicles such as cars, trucks (e.g., pickup trucks, heavy-duty trucks such as class-8 vehicles, etc.), motorcycles, industrial vehicles (e.g., buses), and the like. Each motor vehicle may be a gas, diesel, electric, hybrid, and/or alternative fuel vehicle. Further, the vehicles 120 may include vehicles such as railed vehicles (e.g., trains, trams, and streetcars), watercraft (e.g., ships and recreational pleasure craft), aircraft (e.g., airplanes and helicopters), spacecraft, and the like. Each of the vehicles 120 may be equipped with one of the telematics devices 130.

Further, it is noted that, while only three vehicles 120 having three telematics devices 130 are shown in the illustrated example, it will be appreciated that there may be any number of vehicles 120 and telematics devices 130. For example, the fleet management system 110 may manage hundreds, thousands, or even millions of vehicles 120 and telematics devices 130.

In some embodiments, the telematics devices 130 may be standalone devices that are removably installed in the vehicles 120 (e.g., aftermarket telematics devices). In other embodiments, the telematics devices 130 may be integrated components of the vehicles 120 (e.g., pre-installed by an OEM). As described herein, the telematics devices 130 may collect various telematics data and share the telematics data with the fleet management system 110. The telematics data may include any information, parameters, attributes, characteristics, and/or features associated with the vehicles 120. For example, the telematics data may include, but is not limited to, location data, speed data, acceleration data, fluid level data (e.g., oil, coolant, and washer fluid), energy data (e.g., battery and/or fuel level), engine data, brake data, transmission data, odometer data, vehicle identifying data, error/diagnostic data, tire pressure data, seatbelt data, airbag data, or a combination thereof. In some embodiments, the telematics data may include information relating to the telematics devices 130 and/or other devices associated with or connected to the telematics devices 130. Regardless, it should be appreciated the telematics data is a form of electronic data that requires a computer (e.g., a processor such as those described herein) to transmit, receive, interpret, process, and/or store.

Once received, the fleet management system 110 may process the telematics data obtained from the telematics devices 130 to provide various analysis, predictions, reporting, etc. In some embodiments, the fleet management system 110 may process the telematics data to provide additional information about the vehicles 120, such as, but not limited to, trip distances and times, idling times, harsh braking and driving, usage rates, fuel economy, and the like. Various data analytics may be implemented to process the telematics data. The telematics data may then be used to manage various aspects of the vehicles 120, such as route planning, vehicle maintenance, driver compliance, asset utilization, fuel management, etc., which, in turn, may improve productivity, efficiency, safety, and/or sustainability of the vehicles 120.

A plurality of computing devices 150 may provide access to the fleet management system 110 to a plurality of users 160. The users 160 may use computing devices 150 to access or retrieve various telematics data collected and/or processed by the fleet management system 110 to manage and track the vehicles 120. As will be appreciated, the computing devices 150 may be any suitable computing devices. For example, the computing devices 150 may be any type of computers such as, but not limited to, personal computers, portable computers, wearable computers, workstations, desktops, laptops, smartphones, tablets, smartwatches, personal digital assistants (PDAs), mobile devices, and the like. The computing devices 150 may be remotely located from the fleet management system 110, telematic devices 130, and vehicles 120.

The fleet management system 110, telematics devices 130, and computing devices 150 may communicate through a network 140. The network 140 may comprise a plurality of networks and may be wireless, wired, or a combination thereof. As will be appreciated, the network 140 may employ any suitable communication protocol and may use any suitable communication medium. For example, the network 140 may comprise Wi-Fi™ networks, Ethernet networks, Bluetooth™ networks, near-field communication (NFC) networks, radio networks, cellular networks, and/or satellite networks. The network 140 may be public, private, or a combination thereof. For example, the network 140 may comprise local area networks (LANs), wide area networks (WANs), the internet, or a combination thereof. Of course, as will also be appreciated, the network 140 may also facilitate communication with other devices and/or systems that are not shown.

Further, the fleet management system 110 may be implemented using one or more computers. For example, the fleet management system 110 may be implements using one or more computer servers. The servers may be distributed across a wide geographical area. In some embodiments, the fleet management system 110 may be implemented using a cloud computing platform, such as Google Cloud Platform™ and Amazon Web Services™. In other embodiments, the fleet management system 110 may be implemented using one or more dedicated computer servers. In a further embodiment, the fleet management system 110 may be implemented using a combination of a cloud computing platform and one or more dedicated computer servers.

Figure 2:
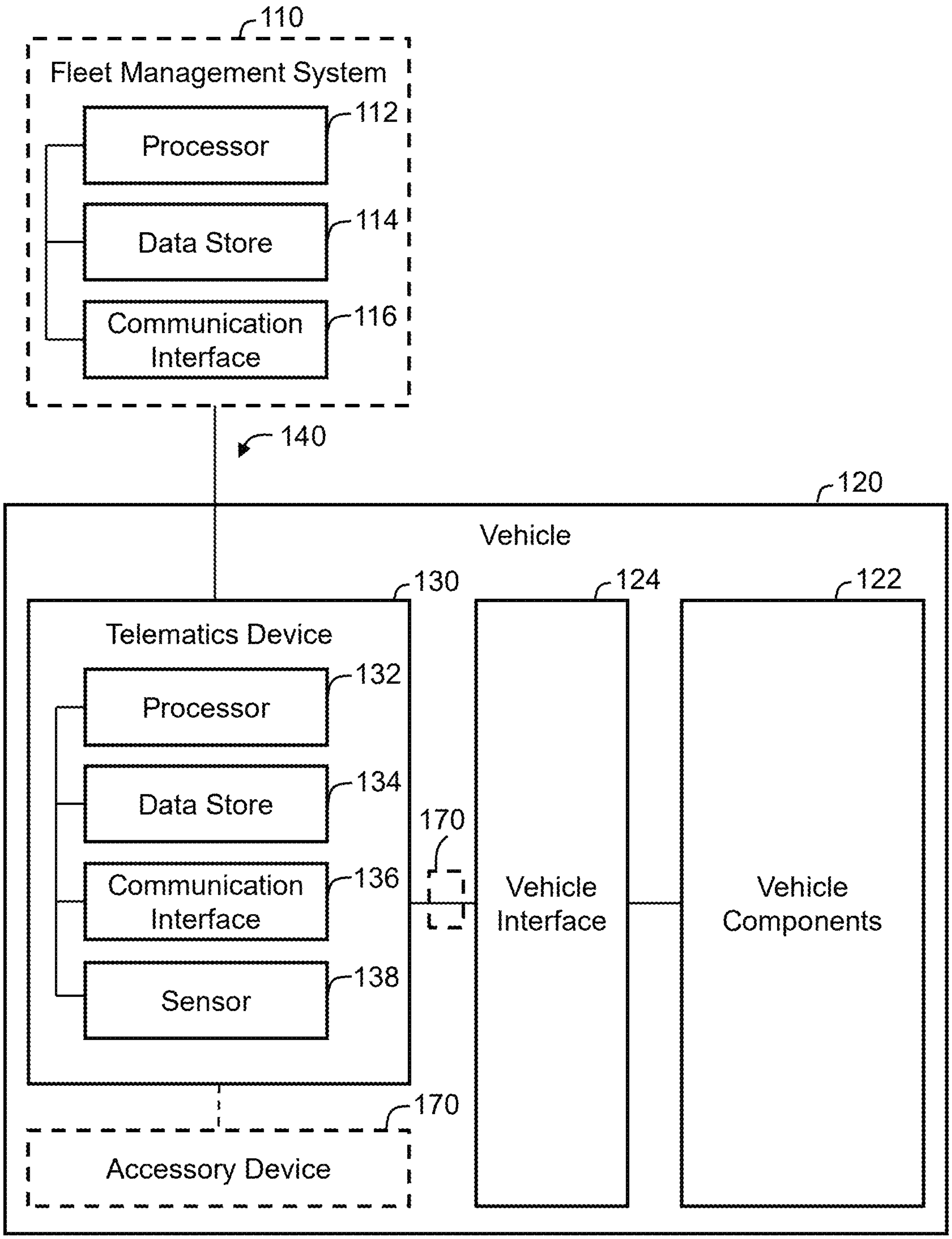
FIG. 2 is a block diagram of an example fleet management system interacting with an example telematics device and an example vehicle, according to an embodiment of the present disclosure.

Referring now to FIG. 2, there is illustrated the fleet management system 110 in communication with one of the telematics devices 130 that is installed in one of the vehicles 120. As shown, the fleet management system 110 may include a processor 112, a data storage 114, and a communication interface 116, each of which may communicate with each other. The processor 112, the data storage 114, and the communication interface 116 may be combined into fewer components, divided into additional subcomponents, or a combination thereof. The components and/or subcomponents may not necessarily be distributed in proximity to one another and may instead be distributed across a wide geographical area.

The processor 112 may control the operation of the fleet management system 110. As will be appreciated, the processor 112 may be implemented using one or more suitable processing devices or systems. For example, the processor 112 may be implemented using central processing units (CPUs), graphics processing units (GPUs), field programmable gate arrays (FPGAs), application specific integrated circuits (ASICs), digital signal processors (DSPs), neural processing units (NPUs), quantum processing units (QPUs), microprocessors, controllers, and the like. The processor 112 may execute various instructions, programs, software, or a combination thereof stored on the data storage 114 to implement various methods described herein. For example, the processor 112 may process various telematics data collected by the fleet management system 110 from the telematics devices 130.

Various data for the fleet management system 110 may be stored on the data storage 114. The data storage 114 may be implemented using one or more suitable data storage devices or systems such as random-access memory (RAM), read only memory (ROM), flash memory, hard disk drives (HDDs), solid-state drives (SSDs), magnetic tape drives, optical disc drives, memory cards, and the like. The data storage 114 may include volatile memory, non-volatile memory, or a combination thereof. Further, the data storage 114 may comprise non-transitory computer readable media. The data storage 114 may store various instructions, programs, and/or software that are executable by the processor 112 to implement various methods described herein. The data storage 114 may store various telematics data collected from the telematics devices 130 and/or processed by the processor 112.

The communication interface 116 may enable communication between the fleet management system 110 and other devices and/or systems, such as the telematics devices 130. The communication interface 116 may be implemented using any suitable communications devices and/or systems. For example, the communication interface 116 may comprise one or more various physical connectors, ports, or terminals such as universal serial bus (USB), ethernet, Thunderbolt, Firewire, serial advanced technology attachment (SATA), peripheral component interconnect (PCI), high-definition multimedia interface (HDMI), DisplayPort, and the like. As another example, the communication interface 116 may comprise one or more wireless interface components to connect to wireless networks such as Wi-Fi™, Bluetooth™, NFC, cellular, satellite, and the like. The communication interface 116 may enable various inputs and outputs to be received at and sent from the fleet management system 110. For example, the communication interface 116 may be used to telematics data from the telematics devices 130.

The telematics devices 130 also may include a processor 134, a data storage 134, and a communication interface 136. The telematics devices 130 may also comprise a sensor 138. Each of the components of the telematics devices 130 may communicate with each other and may be combined into fewer components or divided into additional subcomponents.

The processor 132 may control the operation of the telematics device 130. The processor 132 may be implemented using any suitable processing devices or systems, such as those described above in relation to the processor 112 of the fleet management system 110. The processor 132 may execute various instructions, programs, software, or a combination thereof stored on the data storage 134 to implement various methods described herein. For example, the processor 132 may process various telematics data obtained from vehicle components 122 and/or the sensor 138.

The data storage 134 may store various data for the telematics device 130. The data storage 134 may be any suitable data storage device or system, such as those described above in relation to the data storage 114 of the fleet management system 110. The data storage 134 may store various instructions, programs, software, or a combination thereof executable by the processor 132 to implement various methods described herein. As well, the data storage 134 may store various telematics data obtained from the vehicle components 122 and/or the sensor 138.

The communication interface 136 may enable communication between the telematics devices 130 and other devices or systems, such as the fleet management system 110 and the vehicle components 122. The communication interface 136 may comprise any suitable communication devices or systems, such as those described above in relation to the communication interface 116 of the fleet management system 110. The communication interface 136 may enable various inputs and outputs to be received at and sent from the telematics devices 130. For example, the communication interface 136 may be used to collect vehicle data from the vehicle components 122 and/or sensor 138, to send vehicle data to the fleet management system 110, etc.

The sensor 138 may detect and/or measure various environmental events, changes, etc. The sensor 138 may include any suitable sensing devices or systems, such as, but not limited to, location sensors, velocity sensors, acceleration sensors, orientation sensors, vibration sensors, proximity sensors, temperature sensors, humidity sensors, pressure sensors, optical sensors, audio sensors, and combinations thereof. When the telematics device 130 is installed in the vehicle 120, the sensor 138 may be used to collect telematics data that may not be obtainable from the vehicle components 122. For example, the sensor 138 may include a satellite navigation device such as a global positioning system (GPS) receiver that may measure the location of the vehicle 120. In some embodiments, the sensor 138 may comprise accelerometers, gyroscopes, magnetometers, inertial measurement units (IMUs), or the like that may measure the acceleration and/or orientation of the vehicle 120.

In some embodiments, the telematics devices 130 may operate in conjunction with one or more accessory devices 170 that are in communication therewith. The accessory devices 170 may include one or more expansion devices that may provide additional functionality to the telematics devices 130. For example, the accessory devices 170 may provide additional processing storage, communication, and/or sensing functionality through one or more additional processors, data storages, communication interfaces, and/or sensors (not pictured). The accessory devices 170 may also include adaptor devices that facilitate communication between the communication interface 136 and one or more vehicle interfaces 124, such as a cable harness. The one or more accessory devices 170 may be installed in the vehicle 120 along with the telematics devices 130.

As described herein, the telematics device 130 may be installed within the vehicle 120 removably or integrally. The vehicle 120 may include the vehicle components 122 and the one or more vehicle interfaces 124, which, as will be appreciated, may be combined into fewer components or divided into additional subcomponents. In some embodiments, the vehicle components 122 may comprise any subsystems, parts, subcomponents, or combinations thereof of the vehicle 120. For example, the vehicle components 122 may comprise powertrains, engines, transmissions, steering, braking, seating, batteries, doors, suspensions, etc. The telematics device 130 may obtain various telematics data from the vehicle components 122. For example, in some embodiments, the telematics device 130 may communicate with one or more electrical control units (ECUs) that control the vehicle components 122 or one or more internal sensors thereof.

The vehicle interface 124 may facilitate communication between the vehicle components 122 and other devices or systems. As well, the vehicle interface 124 may comprise any suitable communication devices or systems. For example, the vehicle interface 124 may include an on-board diagnostics (OBD-II) port and/or controller area network (CAN) bus port. The vehicle interface 124 may be used by the telematics device 130 to obtain telematics data from the vehicle components 122. For example, the communication interface 136 may be connected to the vehicle interface 124 to communicate with the vehicle components 122. In some embodiments, the one or more accessory devices 170 (e.g., a wire harness) may provide the connection between the communication interface 136 and the vehicle interface 124.

Figure 3:
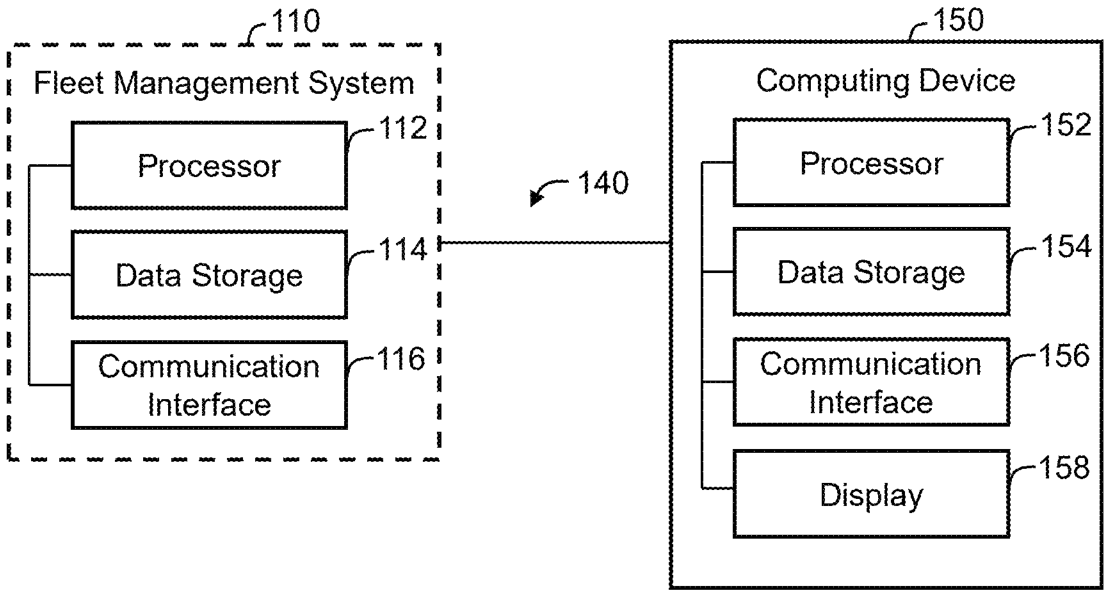
FIG. 3 is a block diagram of an example computing device interacting with an example fleet management system, according to an embodiment of the present disclosure.

Referring now to FIG. 3, there is shown the fleet management system 110 in communication with the computing devices 150. As shown, the computing device 150 may also include a processor 152, a data storage 153, and a communication interface 156. As well, the computing device 150 may include a display 158. Each of the components of the computing device 150 may be communicate with each other and may be combined into fewer components or divided into additional subcomponents.

The processor 152 may control the operation of the computing device 150. The processor 152 may be implemented using any suitable processing devices or systems, such as those described above in relation to the processor 112 of the fleet management system 110. The processor 152 may execute various instructions, programs, software, or a combination thereof stored on the data storage 154 to implement various methods described herein. For example, the processor 152 may process various telematics data received from the fleet management system 110, the telematics devices 130, or a combination thereof.

The data storage 154 may store various data for the computing device 150. The data storage 150 may be any suitable data storage device or system, such as those described above in relation to the data storage 114 of the fleet management system 110. The data storage 154 may store various instructions, programs, software, or a combination thereof executable by the processor 152 to implement various methods described herein. As well, the data storage 154 may store various telematics data received from the fleet management system 110, the telematics devices 130, or a combination thereof.

The communication interface 156 may enable communication between the computing device 150 and other devices or systems, such as the fleet management system 110. The communication interface 156 may be any suitable communication device or system, such as those described above in relation to the communication interface 116 of the fleet management system 110. The communication interface 156 may enable various inputs and outputs to be received at and sent from the computing device 150. For example, the communication interface 156 may be used to retrieve telematics data the fleet management system 110.

The displays 158 may visually present various data for the computing device 150. The displays 158 may be implemented using any suitable display devices or systems, such as, but not limited to, light-emitting diode (LED) displays, liquid crystal displays (LCD), electroluminescent displays (ELDs), plasma displays, quantum dot displays, cathode ray tube (CRT) displays, and the like. The display 158 may be an integrated component that is integral with the computing device 150 or a standalone device that is removable connected to the computing device 150. The display 158 may display various visual representations of the telematics data.

Figure 4:
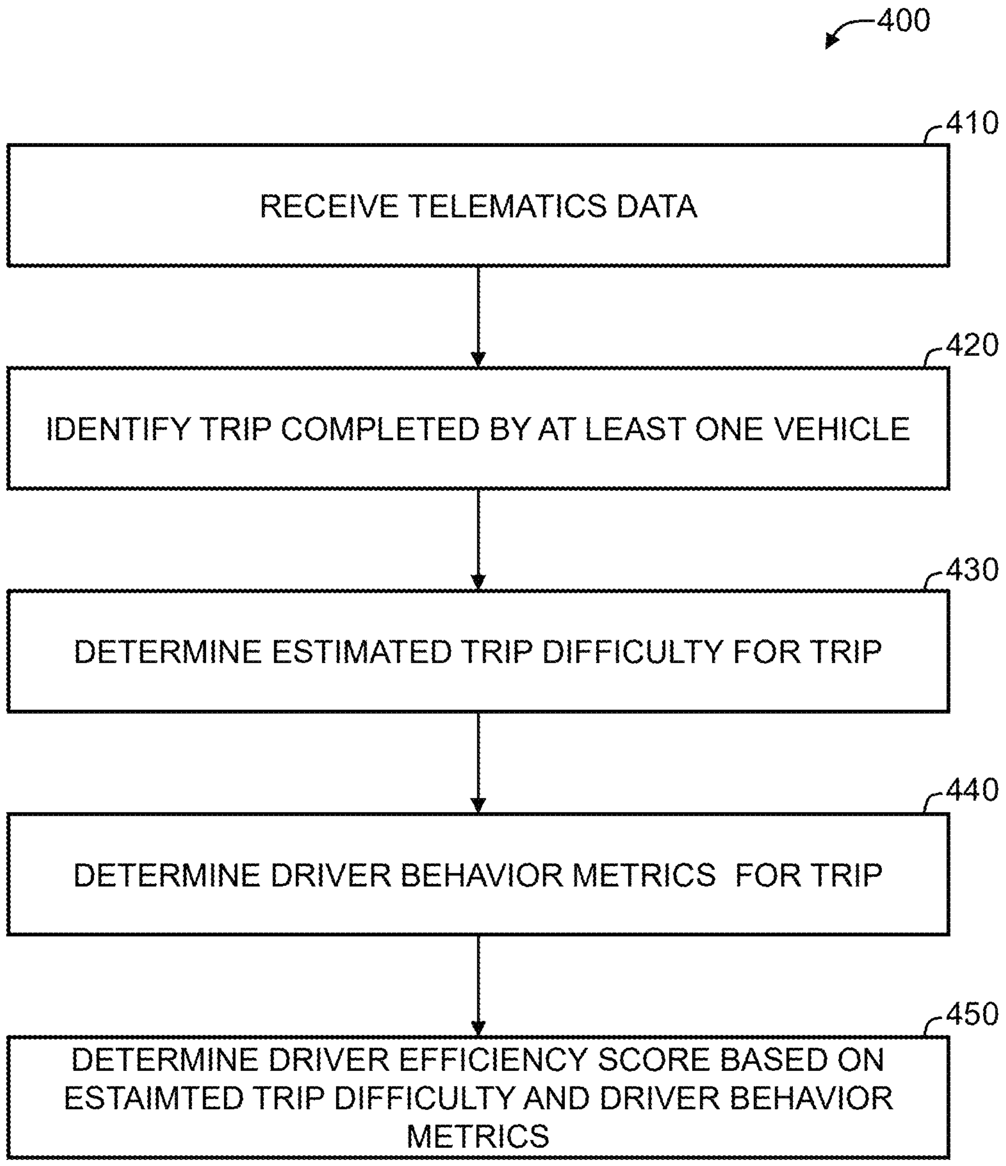
FIG. 4 is a flowchart of an example method for estimating driver efficiency, according to an embodiment of the present disclosure.

Referring now to FIG. 4, there is shown an example method for estimating driver efficiency (400). As shown the method 400 may comprise operating at least one processor to: receive telematics data originating from a plurality of telematics devices installed in a plurality of vehicles (410); identify, using the telematics data, a trip completed by at least one vehicle of the plurality of vehicles (420); determine an estimated trip difficulty of each trip based on a plurality of trip metrics associated therewith that relate to vehicle fuel consumption (430); determine, using the telematics data, a plurality of driver behavior metrics for each trip, each driver behavior metric corresponding to an action performable by a driver of the at least one vehicle (440); and determine, for each trip, a driver efficiency score based at least in part on the estimated trip difficulty and the plurality of driver behavior metrics thereof (450).

In light of the above, the systems and methods of the present disclosure may be implemented to determine a driver efficiency score based at least in part on metrics relating to fuel consumption and driver behavior. The driver efficiency score may therefore correspond to a fuel efficiency of a vehicle during a trip correlated to the driving behaviours of the driver of that vehicle. The inventors of the present disclosure surprisingly found that by using such an approach, the resulting driver efficiency score may accurately represent the fuel efficiency of a particular driver in a format that is readily understandable and useful for, for example, maximizing the fuel efficiency of that driver.

The method 400 may be implemented using any suitable combination of hardware and software, such as those described in reference to FIG. 1 to FIG. 3. For example, one or more operations (e.g., operations 410, 420, 430, 440, and/or 450) of the method 400 may be implemented at the fleet management system (e.g., by the processor 112 executing instructions stored on the data storage 114), at the telematics device 130 (e.g., by the processor 132 executing instructions stored on the data storage 134), at the computing devices 150 (e.g., by the processor 152 executing instructions stored on the data storage 154), or a combination thereof.

At operation 410 of the method 400, telematics data telematics data originating from a plurality of telematics devices installed in a plurality of vehicles may be received.

In more detail, the telematics data may be obtained from the plurality of vehicles using, for example, one or more of the systems outlined in FIG. 1 to FIG. 3. For example, the telematics device 130 (e.g., the processor 132) may receive telematics data from the sensor 138, vehicle components 122, or a combination thereof. Alternatively, or additionally, the fleet management system 110 (e.g., the processor 112) may receive telematics data from the telematics device 130. Additionally, or alternatively, the computing device 150 (e.g., the processor 152) may receive telematics data from the telematics device 130 and/or the fleet management system 110. Additionally, or alternatively, the telematics device 130, the fleet management system 110, and/or the computing device 150 may receive telematics data from one or more data storages (e.g., one or more of the data storages 114, 134, 154).

As indicated above, the telematics data may be used in the systems and methods of the present disclosure for, for example, determining an estimated trip difficulty of a trip based on a plurality of trip metrics associated therewith that relate to vehicle fuel consumption, as well as determining a plurality of driver behavior metrics associated with a trip. Thus, the telematics may include data such as, but not limited to, geospatial data (e.g., location data, speed data, etc.), engine data (e.g., engine speed data, ignition data, etc.), brake data, etc. As well, as also indicated herein, each trip may be completed by a particular vehicle and/or a particular driver. Thus, the telematics data may also include vehicle identifying information (e.g., a vehicle identification number, or VIN), driver identifying information, etc.

In some embodiments, the telematics data may be preprocessed prior to and/or subsequently to being received. For example, the telematics data may be received in one or more various formats, standards, or protocols. In some cases, it may be beneficial to reformat the telematics data prior to use in the systems and methods of the present disclosure. As a further example, the telematics data may include datapoints reported at irregular frequencies and/or that correspond to mismatched points in time. In such cases, the telematics data may be interpolated so that the datapoints in each time series correspond to successive and/or equally spaced points in time. As a yet further example, and as will be described herein, the telematics data may be curve-logged telematics data, which may result in a reduced number of received datapoints. In such implementations, the reduced number of datapoints may be interpolated to provide a fulsome dataset.

Referring now to operation 420 of the method 400, a trip completed by at least one vehicle of the plurality of vehicle may be identified. As will be appreciated, a "trip" may generally refer to the change in location of a vehicle. The start of a trip may therefore correspond to a time at which the vehicle begins moving and the end of the trip may correspond to a time at which the vehicle ceases moving. However, as will be appreciated, vehicles often stop and start moving over the course of a trip (e.g., due to traffic lights). Thus, it may be useful to define the end of the trip based on a minimum stop duration—i.e., a minimum amount of time that the vehicle has ceased moving.

As will be appreciated, the trip completed by the at least one vehicle may therefore be identified using telematics data such as, but not limited to, geospatial data (e.g., location data, speed data, etc.) and engine data (e.g., ignition data).

At operation 430 of the method 400, an estimated trip difficulty of each trip may be determined based on a plurality of trip metrics associated therewith that relate to vehicle fuel consumption. As used herein, the term "estimated trip difficulty" may generally refer to a representation of one or more aspects of the trip that may affect the fuel consumption, and in turn, the fuel efficiency, of the vehicle completing the trip.

For example, in some embodiments, the plurality of trip metrics associated with the trip that relate to vehicle fuel consumption may comprise a weight of the vehicle completing the trip, an altitude change of the vehicle completing the trip, a type of roadway traversed by the vehicle completing the trip, or a combination thereof. In such embodiments, the weight of the vehicle completing the trip may be determined using any suitable technique such as, but not limited to, the use of a vehicle weigh scale, estimating the vehicle weight based on the telematics data originating therefrom (e.g., the acceleration data), etc. As will be appreciated, it may be the case that the weight of the vehicle completing the trip changes over the course of the trip (e.g., due to completing deliveries). In such cases it may be useful to determine the estimated trip difficulty based on, for example, an average weight of the vehicle completing the trip.

The altitude change experienced by the vehicle completing the trip may also be determined using any suitable technique. For example, in some embodiments, the altitude change experienced by the vehicle may be determined by a sensor of the telematics device (e.g., a barometric sensor, an accelerometer, etc.), or may be determined based on telematics data such as engine speed data (e.g., rotations per minute, or RPM, data), transmission data (e.g., the types of gears used by the vehicle to completing the trip), etc. The altitude change may be a net altitude change (e.g., based on the starting altitude and the ending altitude of the trip), an absolute altitude change (e.g., based on the distance traversed by the vehicle while increasing in altitude), a weighted altitude difference (e.g., wherein ascended elevation and descended elevation are weighted differently), or the like.

The type of roadway traversed by the vehicle may also be determined, for example, based on the telematics data originating from the vehicle. For example, in some embodiments, geospatial data such as speed data may be used to approximate the type of roadway traversed by the vehicle. In such embodiments, a vehicle travelling at a speed above a predetermined threshold may be determined to be traversing, for example, a highway, while a vehicle travelling at a speed below the predetermined threshold may be determined to be traversing, for instance, a residential roadway. However, it may in some cases be useful to determine the types of roadways traversed using data other than telematics data. For example, in some embodiments, the method 400 may further comprise operating the at least one processor to retrieve map data, and the types of roadways traversed by the vehicle competing the trip may be determined using the map data. In more detail, the map data may generally include information, parameters, attributes, characteristics, and/or features associated with a geographical area. For example, the map data may include information relating to the location, placement, size, shape, and/or design of infrastructure (e.g., road networks comprising road segments such as, but not limited to, roads, streets, highways, freeways, alleyways, motorways, motorways, trunk roads, primary roads, secondary roads, tertiary roads, etc.), topographical features (e.g., rivers, mountains, hills, greenways, etc.), regulatory features, (e.g., country borders, state or provincial borders, city limits, counties, neighbourhoods, etc.) or a combination thereof, and thus may be used to determine the types of roadways traversed by the vehicle completed the trip. The map data may be obtained from, for example, various map information providers such as OpenStreetMap (OSM).

As will be appreciated, the above-discussed trip metrics relate to fuel consumption in that the weight of a vehicle, the elevation, or elevations, traversed by the vehicle, and the types of roadways traversed by the vehicle may each affect how much fuel is required by the vehicle to complete the trip.

In some embodiments, the estimated trip difficulty of each trip may be determined by operating the at least one processor to by determine, for each trip, a trip difficulty classification by inputting into at least one machine learning model the plurality of trip metrics associated therewith, the at least one machine learning model trained to classify trips based the plurality of trip metrics. In such embodiments, the trip difficulty classification may indicate that the trip is of a particular difficulty and may therefore represent the estimated trip difficulty.

The particular trip difficulty classification may be any suitable classification. For example, in some embodiments, a plurality of trip difficulty classifications may be generated based on the plurality of trip metrics associated therewith. In such examples, a trip having a low-difficulty classification may have been completed by an unloaded, or relatively light, vehicle along a relatively flat highway, while a trip having a high-difficulty classification may have been completed by a loaded, or relatively heavy, vehicle along hilly residential roadways. The machine learning model used to generate the trip difficulty classification for the trip may be any suitable machine learning model such as, but not limited to a classifier machine learning model. For example, in some embodiments, the at least one machine learning model may comprise a linear regression model, a Naïve Bayes model, a k-nearest neighbors model, a k-means clustering model, or the like.

At operation 440 of the method 400, it is shown that a plurality of driver behavior metrics for each trip may be determined using the telematics data. In more detail, and as indicated above, each driver behavior metric may correspond to an action performable by a driver of the at least one vehicle.

For example, in some embodiments, the plurality of driver behavior metrics may comprise brake pedal metrics, accelerator pedal metrics, engine speed metrics, cruise control metrics, ignition metrics, speed metrics, or a combination thereof. In a further embodiment, the plurality of driver metrics may comprise harsh braking metrics (e.g., the number of times harsh braking is performed during the trip), brake pedal depression metrics (e.g., the number of times the brake pedal is depressed during the trip), acceleration pedal depression metrics (e.g., the number of times that the accelerator pedal is fully depressed during the trip), cruise control distance metrics (e.g., the distance travelled with cruise control activated during the trip), coasting distance metrics (e.g., the distance travelled by coasting during the trip), engine speed threshold metrics (e.g., the distance travelled with the engine speed above a predetermined threshold during the trip), idling time metrics (e.g., the amount of time spent with the ignition engaged while stationary during the trip), excessive speed metrics (e.g., the distance travelled at a speed greater than a speed limit during the trip), or a combination thereof. As will be appreciated, such driver behavior metrics may be determined from telematics data such as, for example, geospatial data, brake data, engine data, and the like.

Referring now to operation 450 of the method 400, a driver efficiency score for each trip may be determined based at least in part on the estimated trip difficulty and the plurality if driver behavior metrics thereof. As described herein, the driver efficiency score may therefore correspond to the fuel efficiency (i.e., due to the estimated trip difficulty determined based on the plurality of trip metrics relating to fuel consumption) as well as driver behaviour during a trip.

In more detail, in some embodiments, the driver efficiency score may be determined by operating the at least one processor to: generate a plurality of weighted driver behavior metrics by applying to each of the plurality of driver behavior metrics a weight selected based at least in part on a type of each of the plurality of driver behavior metrics and the estimated trip difficulty for each trip; and aggregate the weighted driver behavior metrics for each trip to thereby determine the driver efficiency score thereof. The inventors surprisingly found that, by applying to each driver behaviour metric a weight selected based on the type of driver behavior metric as well as the particular estimated difficulty of the trip, an accurate representation of fuel efficiency may be determined (i.e., the driver efficiency score). For example, a particular driver behaviour (i.e., as represented by a particular driver behaviour metric) may have more of an effect on overall fuel efficiency if the trip has a low-difficulty classification or, alternatively, may have less of an effect on overall fuel efficiency if the trip has a high-difficulty classification (e.g., due to certain driving behaviours being required to complete the trip).

In the above-described embodiment, the weight to be applied to each of the plurality of driver behavior metrics may be selected using any suitable technique. For example, in some embodiments, the generating of the plurality of weighted driver behavior metrics may comprise operating the at least one processor to: estimate a fuel efficiency value for a plurality of trips (e.g., completed by one or more of the plurality of vehicles) having associated therewith a particular trip difficulty by inputting into at least one machine learning model the plurality of driver behavior metrics associated with each of the plurality of trips; determine an importance of each of the plurality of driver behavior metrics in the determining of the fuel efficiency value by the at least one machine learning model for the particular trip difficulty; and selecting a weight to be applied to each of the plurality of driver metrics based at least in part on the importance of each thereof in the determination of the fuel efficiency of the plurality of trips having associated therewith the particular estimated trip difficulty. That is, in such embodiments, the weight to be applied to each of the plurality of driver behaviour metrics of a trip in order to determine the driver efficiency score for that trip may be selected based on the importance of each of the plurality of driver behaviour metrics in the determination of the fuel efficiency of trips having the same estimated trip difficulty associated therewith. It is further noted that, in such embodiments, the at least one machine learning model employed to estimate the fuel efficiency of the trips having a particular estimated trip difficulty associated therewith may be any suitable model such as, but not limited to, a random forest model, a regression model, etc.

In a further example, the selecting of weights for application to each of the plurality of driver behavior metrics may be performed using optimization. In more detail, in some embodiments, the generating of the plurality of weighted driver behavior metrics may comprise operating the at least one processor to correlate a plurality of driver behavior metrics associated with a plurality of trips having a particular estimated trip difficulty associated therewith and the fuel efficiency of each of the plurality of trips by applying thereto a linear regression model; evaluate a correlation between each of the plurality of driver behavior metrics and the fuel efficiency of the plurality of trips having the particular estimated trip difficulty associated therewith; adjust one or more parameters of the linear regression model in order to maximize each correlation between each of the plurality of driver behavior metrics and the fuel efficiency of the plurality of trips having the particular estimated trip difficulty associated therewith; and select a weight to be applied to each of the plurality of driver metrics based on a maximized correlation between each of the plurality of driver behavior metrics and the fuel efficiency of the plurality of trips having the particular estimated trip difficulty associated therewith. As will be appreciated, such embodiments may "optimize" the parameters of the linear regression mode model to produce a maximized correlation between variables (i.e., the fuel efficiency of trips having a particular estimated trip difficulty associated therewith and the plurality of driver behaviour metrics associated with each of the trips).

Further, as will be appreciated, the driver behavior metrics for a particular trip may vary in units, scale, etc. and, as a result, may be difficult to use determining driver efficiency scores. For example, particular driver behavior metrics may correspond to a length of time for which a particular driver behavior was performed, while other driver behavior metrics may correspond to a total distance that another driver behavior was performed. Thus, in some embodiments, the determining of the driver efficiency score may further comprise operating the at least one processor to scale the plurality of driver behavior metrics such that each of the plurality of driver behavior metrics is within a same selected range (e.g. 0 to 10). As well, it will also be appreciated that the length of trips completed by a vehicle may vary greatly in length (e.g., in terms of distance, time, etc.). Thus, it may also in some cases be useful to normalize the driver behavior metrics based on, for example, the length of the trip associated therewith and the total length of a plurality of trips having associated therewith a same estimated trip difficulty there as.

Thus, as described above, a driver efficiency score may be determined for each trip completed by the at least one vehicle, the driver efficiency score being a representation of the fuel efficiency of a driver completing a trip of a particular difficulty.

In some embodiments, it may be useful to determine the driver efficiency score of a driver, or vehicle known to be operated by the driver, based on a plurality of trips completed thereby. As will be appreciated, such embodiments may be useful for maximizing fuel efficiency across all types of trips (e.g., trips having varying estimated trip difficulties associated therewith). For example, in some embodiments, the method 400 may further comprise operating the at least one processor to generate an aggregated driver efficiency score by aggregating the driver efficiency score associated with each trip completed by the at least one vehicle. In such embodiments, the aggregating of the driver scores may be performed using any suitable technique.

Once determined, the driver efficiency scores may be used for a number of downstream applications. For example, in some embodiments, the driver efficiency score may be displayed to the driver with one or more suggestions for improving the efficiency score (i.e., maximize their fuel efficiency). Such embodiments may generally refer to "driver coaching", wherein a driver is "coached" to improve their performance, improve their fuel efficiency, etc. In a further embodiment, the driver efficiency scores for the drivers of a vehicle fleet may be aggregated to generate a fleet efficiency score, corresponding to the fuel efficiency of a vehicle fleet based on the trips completed by, and the driving behaviors of, the drivers of the vehicles of the vehicle fleet.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A system for estimating driver efficiency, the system comprising:

at least one data storage operable to store telematics data originating from a plurality of telematics devices installed in a plurality of vehicles; and at least one processor in communication with the at least one data storage, the at least one processor operable to:

identify, using the telematics data, a trip completed by at least one vehicle of the plurality of vehicles;

determine an estimated trip difficulty of each trip based on a plurality of trip metrics associated therewith that relate to vehicle fuel consumption;

determine, using the telematics data, a plurality of driver behavior metrics for each trip, each driver behavior metric corresponding to an action performable by a driver of the at least one vehicle; and determine, for each trip, a driver efficiency score by:

generating a plurality of weighted driver behavior metrics by applying to each of the plurality of driver behavior metrics a weight selected based at least in part on a type of each of the plurality of driver behavior metrics and the estimated trip difficulty for each trip; and aggregating the weighted driver behavior metrics for each trip to thereby determine the driver efficiency score thereof.

2. The system of claim 1, wherein the at least one processor is operable determine the estimated trip difficulty of each trip by determining, for each trip, a trip difficulty classification by applying to the plurality of trip metrics associated therewith at least one machine learning model trained to classify trips based on plurality of trip metrics associated therewith.

3. The system of claim 1, wherein the plurality of trip metrics related to vehicle fuel consumption comprises a weight of a vehicle completing the trip, an altitude change experienced by the vehicle completing the trip, a type of roadway traversed by the vehicle completing the trip, or a combination thereof.

4. The system of claim 1, wherein the plurality of driver behavior metrics comprise brake pedal metrics, accelerator pedal metrics, engine speed metrics, cruise control metrics, ignition metrics, speed metrics, or a combination thereof.

5. The system of claim 4, wherein the plurality of driver behavior metrics comprise harsh braking metrics, brake pedal depression metrics, acceleration pedal depression metrics, cruise control distance metrics, coasting distance metrics, engine speed threshold metrics, idling time metrics, excessive speed metrics, or a combination thereof.

6. The system of claim 1, wherein the at least one processor is further operable to generate an aggregated driver efficiency score by aggregating the driver efficiency score associated with each trip completed by the at least one vehicle within a selected time period.

7. A method for estimating driver efficiency, the method comprising operating at least one processor to:

receive telematics data originating from a plurality of telematics devices installed in a plurality of vehicles;

identify, using the telematics data, a trip completed by at least one vehicle of the plurality of vehicles;

determine an estimated trip difficulty of each trip based on a plurality of trip metrics associated therewith that relate to vehicle fuel consumption;

determine, using the telematics data, a plurality of driver behavior metrics for each trip, each driver behavior metric corresponding to an action performable by a driver of the at least one vehicle; and determine, for each trip, a driver efficiency score by:

generating a plurality of weighted driver behavior metrics by applying to each of the plurality of driver behavior metrics a weight selected based at least in part on a type of each of the plurality of driver behavior metrics and the estimated trip difficulty for each trip; and aggregating the weighted driver behavior metrics for each trip to thereby determine the driver efficiency score thereof.

8. The method of claim 7, wherein the determining of the estimated trip difficulty of each trip comprises determining, for each trip, a trip difficulty classification by applying to the plurality of trip metrics associated therewith at least one machine learning model trained to classify trips based on the plurality of trip metrics associated therewith.

9. The method of claim 7, wherein the plurality of trip metrics related to vehicle fuel consumption comprises a weight metric of a vehicle completing the trip, an altitude change experienced by the vehicle completing the trip, a type of roadway traversed by the vehicle completing the trip, or a combination thereof.

10. The method of claim 9, wherein the plurality of driver behavior metrics comprise brake pedal metrics, accelerator pedal metrics, engine speed metrics, cruise control metrics, ignition metrics, speed metrics, or a combination thereof.

11. The method of claim 10, wherein the plurality of driver behavior metrics comprise harsh braking metrics, brake pedal depression metrics, acceleration pedal depression metrics, cruise control distance metrics, coasting distance metrics, engine speed threshold metrics, idling time metrics, excessive speed metrics, or a combination thereof.

12. The method of claim 7, further comprising operating the at least one processor to generate an aggregated driver efficiency score by aggregating the driver efficiency score associated with each trip completed by the at least one vehicle.

13. A non-transitory computer-readable medium having instructions stored thereon executable by at least one processor to implement a method for estimating driver efficiency, the method comprising operating at least one processor to:

receive telematics data originating from a plurality of telematics devices installed in a plurality of vehicles;

identify, using the telematics data, a trip completed by at least one vehicle of the plurality of vehicles;

determine an estimated trip difficulty of each trip based on a plurality of trip metrics associated therewith that relate to vehicle fuel consumption;

determine, using the telematics data, a plurality of driver behavior metrics for each trip, each driver behavior metric corresponding to an action performable by a driver of the at least one vehicle; and determine, for each trip, a driver efficiency score by:

generating a plurality of weighted driver behavior metrics by applying to each of the plurality of driver behavior metrics a weight selected based at least in part on a type of each of the plurality of driver behavior metrics and the estimated trip difficulty for each trip; and aggregating the weighted driver behavior metrics for each trip to thereby determine the driver efficiency score thereof.

* * * * *